(12) United States Patent
Yamaoka

(10) Patent No.: US 7,116,455 B2
(45) Date of Patent: Oct. 3, 2006

(54) IMAGING APPARATUS

(75) Inventor: Nobusuke Yamaoka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/943,981

(22) Filed: Sep. 20, 2004

(65) Prior Publication Data

US 2005/0099664 A1   May 12, 2005

(30) Foreign Application Priority Data

Sep. 26, 2003   (JP)   ............................. 2003-334800

(51) Int. Cl.
   *G02B 26/08*   (2006.01)
(52) U.S. Cl. ..................................... 359/212
(58) Field of Classification Search ................ 359/212, 359/204
   See application file for complete search history.

(56) References Cited

U.S. PATENT DOCUMENTS

2003/0031215 A1*   2/2003   Kane et al. .................... 372/10
2004/0090599 A1*   5/2004   Kowarz et al. ............. 359/259

FOREIGN PATENT DOCUMENTS

JP   5-304624   11/1993
JP   11-122238   4/1999

OTHER PUBLICATIONS

"Grating Light Valve", Featuring, MEMS, 4 pages (with partial English translation).
David T. Amm, et al., "Optical Performance of the Grating Light Valve Technology", Projection Display V Symposium, vol. 3634, 1999, pp. 71-78.

* cited by examiner

Primary Examiner—Euncha P. Cherry
(74) Attorney, Agent, or Firm—Oblon, Spivak, McClelland, Maier & Neustadt, P.C.

(57) ABSTRACT

An imaging apparatus having a projector function which is advantageous in reducing size is provided. A light source of the imaging apparatus is constituted by three semiconductor lasers which respectively frontward emit lights of red, green and blue, each slit-shaped. To a GLV (Grating Light Valve) is applied a drive voltage as modulated by a projection image signal, so that the GLV diffracts the three lights emitted from the light source, with varying the amount or intensity of each light in accordance with the drive voltage or projection image signal. A scanning mirror is disposed between a taking lens and an image pickup device, so as to reflect the lights diffracted by the GLV toward the taking lens, with having each diffracted slit-shaped light scan in a direction.

17 Claims, 3 Drawing Sheets

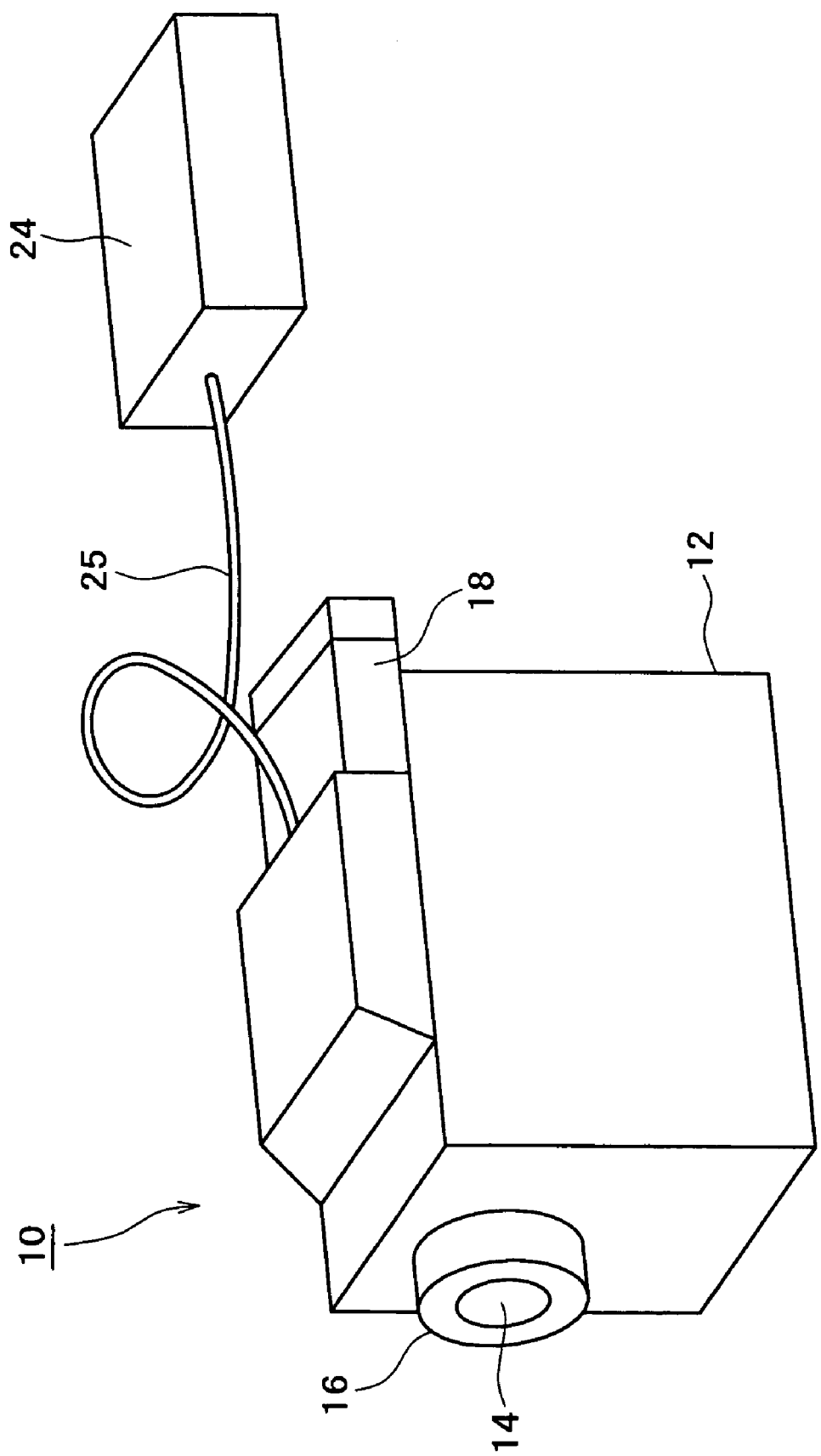

IMAGING APPARATUS

BACKGROUND OF THE INVENTION

1. Field of the Invention

The present invention relates to an imaging apparatus.

2. Description of Related Art

There has been proposed an apparatus where a projector function is additionally provided to an imaging apparatus such as a video camera, as disclosed in JP-A-5-304624 for instance.

The imaging apparatus comprises a light source and a projector lens which are respectively disposed in front and rear of a light transmissive liquid crystal panel for a viewfinder. A light emitted from the light source is transmitted through the liquid crystal panel and guided to the projector lens, by which a projection corresponding to one formed on the liquid crystal panel is formed.

In the conventional imaging apparatus, a white light source which produces a high intensity light is employed as the light source. When the white light source is operated, its temperature rises high, requiring a cooling fan for cooling the light source. Thus, some space inside the imaging apparatus is occupied by the cooling fan, hindering reduction in the size of the imaging apparatus.

SUMMARY OF THE INVENTION

The present invention has been developed in view of the above-described situation, and an object of the invention is, therefore, to provide an imaging apparatus having a projector function, which is constructed advantageously in regard to size reduction.

To attain the object, the invention provides an imaging apparatus operable to generate image data based on an image of an object formed by means of a taking lens, and record the image data on a recording medium, the imaging apparatus comprising: a light source constituted by a semiconductor laser which emits a light; a Grating Light Valve which is supplied with a projection image signal and diffracts the light emitted from the light source with varying an intensity of the light based on the projection image signal; and a scanning mirror which reflects the diffracted light toward the taking lens with having the diffracted light scan in a direction, so that the diffracted light forms the image of the object in front of the taking lens and by means of the taking lens.

Since the imaging apparatus according to the invention comprises the light source constituted by the semiconductor laser, Grating Light Valve diffracting the light emitted from the light source, and scanning mirror reflecting the diffracted light toward the taking lens with having the diffracted light scan in a direction, the size of the light source itself of the imaging apparatus is relatively small compared to the conventional apparatus where a white light source is used, omitting the cooling fan for cooling the light source. The invention thus facilitates reducing the size of an imaging apparatus having a projector function.

Other and further objects, features and advantages of the invention will appear more fully from the following description.

BRIEF DESCRIPTION OF DRAWINGS

FIG. 3 is a perspective view showing a structure of an imaging apparatus according to a second embodiment of the invention.

DETAILED DESCRIPTION OF THE PREFERRED EMBODIMENTS

The object of the invention, namely, to reduce the size of an imaging apparatus, is attained by providing a light source constituted by a semiconductor laser which emits a light consisting of a laser beam, a Grating Light Valve and a scanning mirror.

<First Embodiment>

There will be described a first embodiment of the invention, by reference to FIGS. 1 and 2.

Figure 1:
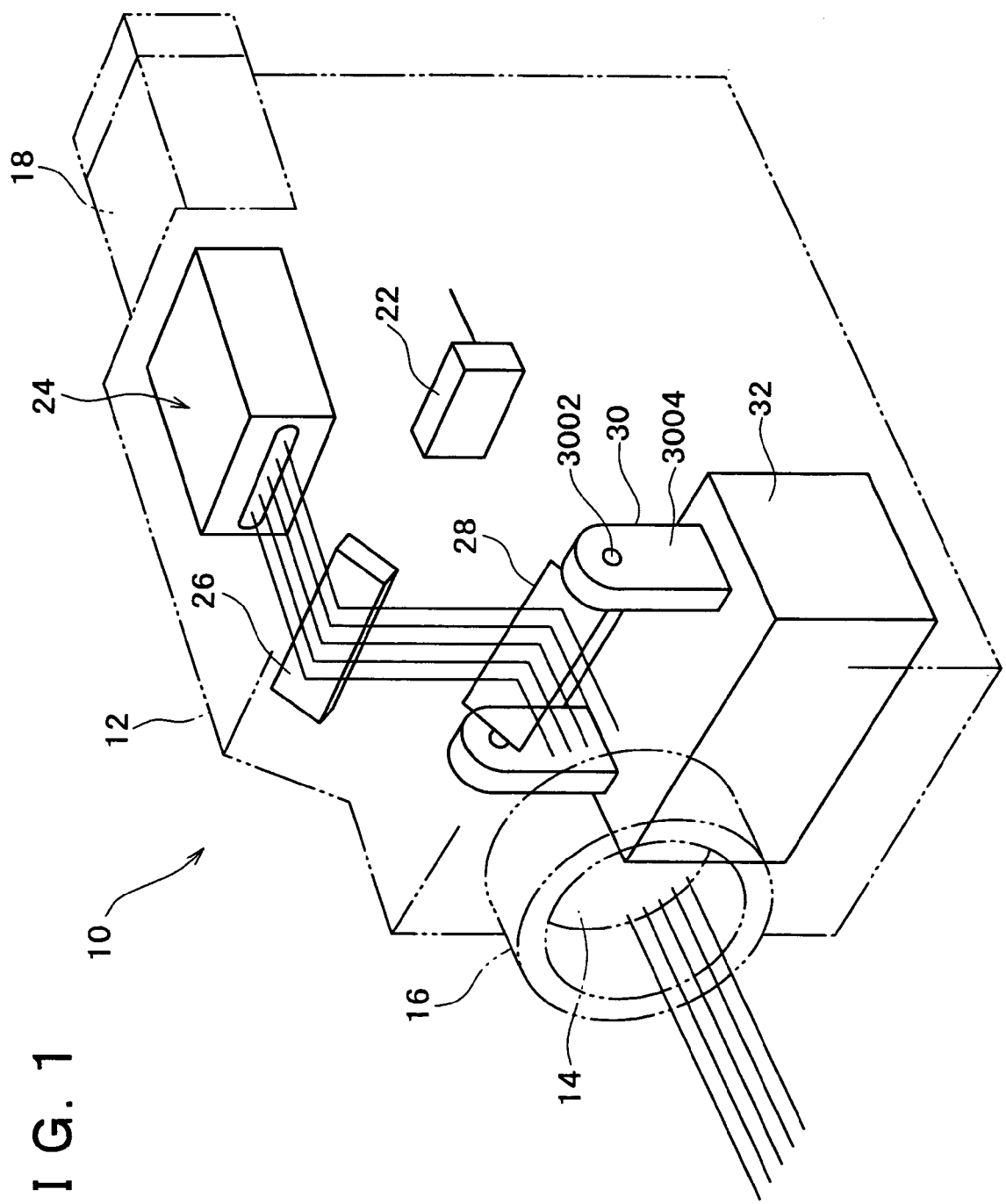
FIG. 1 is a perspective view showing a structure of an imaging apparatus according to a first embodiment of the invention.
Figure 2:
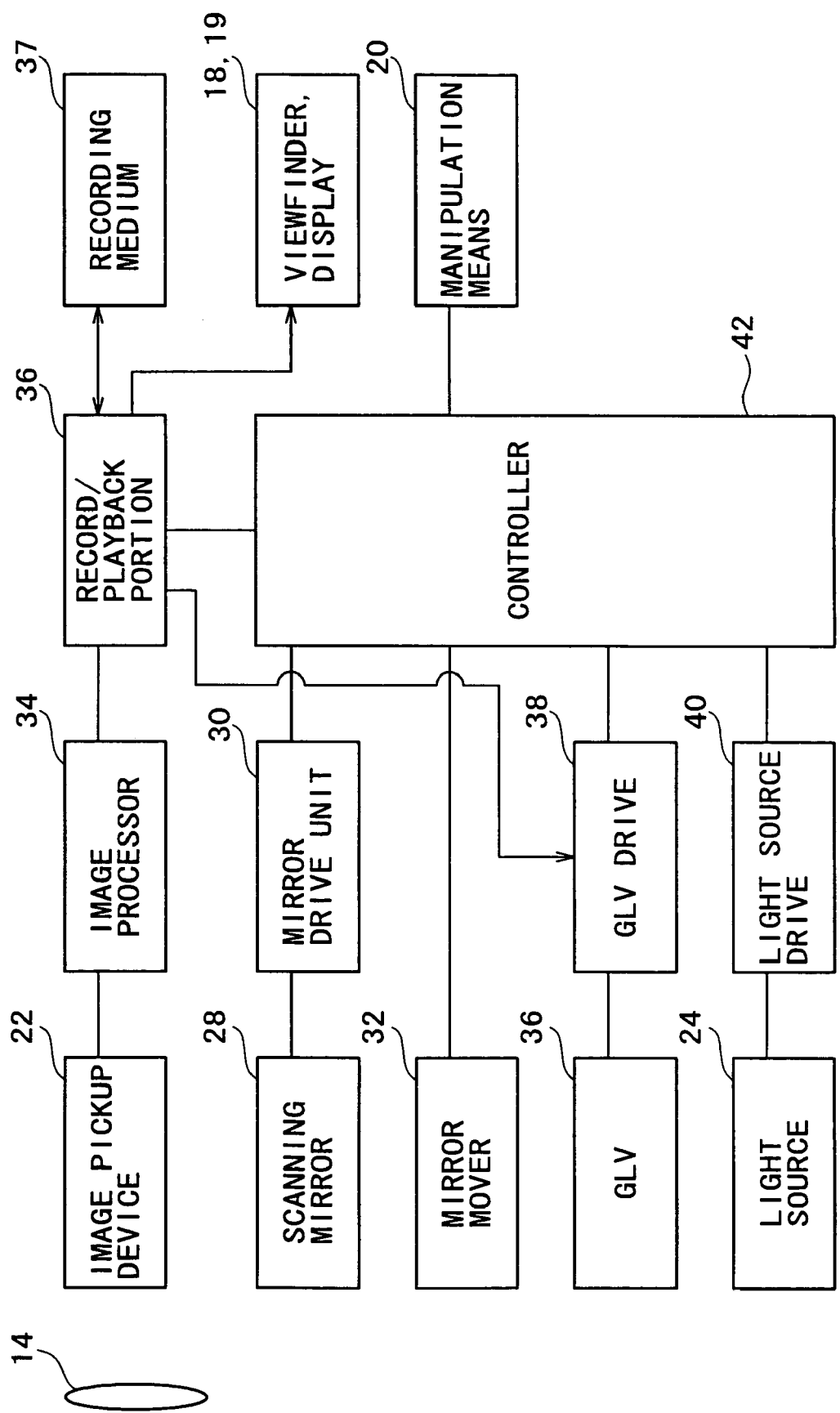
FIG. 2 is a block diagram showing the structure of the imaging apparatus.

FIG. 1 is a perspective view showing a structure of an imaging apparatus 10 according to the first embodiment, while FIG. 2 is a block diagram showing the structure of the imaging apparatus 10.

As shown in FIG. 1, the imaging apparatus 10 is a video camera having a housing 12.

In the upper part of the front face of the housing 12, there is disposed a lens barrel 16 holding a taking lens 14, while in the upper part of the rear side of the housing 12 is disposed a viewfinder 18 having a liquid crystal display or the like.

On the lateral faces of the housing 12, there is disposed manipulation means 20 (indicated in FIG. 2) including an ON/OFF button, a shutter/video button, a play button and a mode button. The mode button is manipulated or switched for selecting whether the video camera 10 is to be operated as a usual video camera or as a projector.

A display 19 (indicated in FIG. 2), which may be constituted by a liquid crystal display, is joined to one of the lateral faces of the housing 12 via a hinge mechanism. The display 19 is for displaying an image while the image is being captured, just like the viewfinder 18 does, or for displaying a previously taken image when the image is played back.

Inside the housing 12, there are provided an image pickup device 22, a light source 24, a Grating Light Valve 26, a scanning mirror 28, a mirror drive unit 30, a mirror mover 32, etc.

The image pickup device 22 is disposed in a light path of the taking lens 14 to take an image of an object as formed by means of the taking lens 14, generating an image signal indicative of the image.

The light source 24 is disposed above the light path of the taking lens 14. In the present embodiment, the light source 24 is constituted by three semiconductor lasers (or three laser diodes), which respectively emit lights of R (red), G (green) and B (blue), frontward.

Generating little heat, such semiconductor lasers need not be cooled by using a cooling fan and therefore occupies only a significantly small space compared to the conventional apparatus where a white light source is employed as the light source.

In the light source 24 is incorporated a lighting lens not shown, and each light is converted by the lighting lens into a light of a strip-like or slit shape. That is, a vertical dimension of each emitted light is smaller than a lateral dimension thereof.

The Grating Light Valve 26 is disposed in front of the light source 24 and above the light path of the taking lens 14.

This Grating Light Valve (hereinafter simply referred to as GLV) 26 is a one-dimensional reflective display device in which optical diffraction elements each of which is ribbon-shaped are formed in a row on a silicon substrate, and constructed to be able to modulate the intensity of the light diffracted by the GLV correspondingly to a drive voltage applied thereto, as disclosed in http://www.sony.co.jp/Products/SC-HP/CXPAL/CXPAL-55/PDF/MEM S.pdf, and D. T. Amm et al. "Optical Performance of the Grating Light Valve Technology," Projection Displays V Symposium, SPIE SPIE Proceedings Vol.EI 3634-10, February 1999.

In the present embodiment, the drive voltage, which is modulated in accordance with a projection image signal, is supplied to the GLV 26, so that the three slit-shaped lights emitted from the light source 24 are diffracted by the GLV 26 with the amount of each diffracted light (i.e. intensity of the light) being varied depending upon the drive voltage or the projection image signal.

The modulation of the drive voltage applied to the GLV 26 thus enables to form a multi-level one-dimensional image, and a two-dimensional image can be formed by scanning such a one-dimensional image.

The scanning mirror 28 is formed in such a size that the scanning mirror 28 can reflect the slit-shaped lights diffracted by the GLV 26, and is disposed between the taking lens 14 and the image pickup device 22 so as to reflect the diffracted lights toward the taking lens 14 with having the diffracted lights scan in a direction.

The mirror drive unit 30 has a pivot shaft 3002 extending in the lateral direction, on which the scanning mirror 28 is mounted, and a pair of supporting parts 3004 rotatably supporting opposite ends of the pivot shaft 3002. The pivot shaft 3002 is rotated by a motor or others so that the scanning mirror 28 is rotated or oscillated. In the present embodiment, the scanning mirror 28 is operated by the mirror drive unit 30 so that the slit-shaped diffracted lights scan in the vertical direction with the width direction of each diffracted light parallel to the lateral direction.

The mirror mover 32 is fixed to the housing 12 and holds the mirror drive unit 30 such that the mirror drive unit 30 is movable in the vertical direction so that the scanning mirror 28 is shiftable between an operating position in the light path of the taking lens 14 and a non-operating or retracted position off the light path.

Further, the diffracted lights which are made to scan by the scanning mirror 28 as positioned at the operating position together form an image by means of, and in front of, the taking lens 14.

There will be described a structure of a control system of the imaging apparatus 10, by reference to FIG. 2.

As shown in FIG. 2, the imaging apparatus 10 further has an image processor 34, a record/playback portion 36, a GLV drive 38, a light source drive 40 and a controller 42.

The image processor 34 generates image data by processing the image signal inputted from the image pickup device 22.

The record/playback portion 36 performs a recording operation for recording the image data generated by the image processor 34 onto a recording medium 37 such as a magnetic recording medium or a memory card, and a playback operation for reading the image data from the recording medium 37 to play back the image data. In a playback operation, the record/playback portion 36 transfers the image data to the viewfinder 18 and the display 19 to present the image thereon, and supply the projection image signal, which is generated based on the image data, to the GLV drive 38.

The GLV drive 38 applies the drive voltage in accordance with the projection image signal supplied from the record/playback portion 36, to the GLV 26. The operation of the GLV drive 38 is controlled by the controller 42.

The light source drive 40 drives the light source 24 based on a command outputted from the controller 42 such that each of the RGB lights is selectively emitted.

The controller 42 switches between ON/OFF states of the imaging apparatus 10 and between operation modes of the apparatus 10, namely, an image taking operation mode and a playback operation mode, in response to an operation of the ON/OFF button, a shutter/video button and a play button of the manipulation means 20.

The controller 42 also controls the scanning operation of the scanning mirror 28 by issuing commands to the mirror drive unit 30, and controls the shifting of the scanning mirror 28 by issuing commands to the mirror mover 32.

Further, the controller 42 controls the GLV drive 38 and light source drive 40 to have the GLV 38 perform, by time division, a first diffracting operation, a second diffracting operation and a third diffracting operation. In the first diffracting operation, the light of R is diffracted by the GLV 38, while in the second and third diffracting operations, the G and B lights are diffracted by the GLV 38, respectively.

There will next be described operation of the imaging apparatus 10.

First, a case where the imaging apparatus 10 is operated as a usual video camera is described.

When the mode button of the manipulation means 20 is switched to a "video camera" position from a "projection" position, the controller 42 controls the mirror mover 32 to shift the scanning mirror 28 to the retracted position, and also controls the mirror drive unit 30 to hold the scanning mirror 28 non-operated.

When an image taking operation is performed in this state, the image signal outputted from the image pickup device 22 is fed to the image processor 34 which then generates the image data. The image data is recorded onto the recording medium 37 by the record/playback portion 36. The image data is transferred to the viewfinder 18 and display 19 as well, to be presented thereon.

When a playback operation is performed, the image data played by the record/playback portion 36 from the recording medium 37 is supplied to the viewfinder 18 and display 19 to be presented thereon.

Next, another case where the imaging apparatus is operated as a projector is described.

In front of the imaging apparatus 10, there is placed a screen on which the image formed by the taking lens 14 is projected.

When the mode button of the manipulation means 20 is switched to the "projector" position, the controller 42 controls the mirror mover 32 to move the scanning mirror 28 to the operating position, and also controls the mirror drive unit 30 to initiate an operation of the scanning mirror 28.

When a playback operation is performed in this state, the drive voltage as modulated in accordance with the projection image signal, which is generated based on the image data played from the recording medium 37 by the record/playback portion 36, is applied to the GLV 26 from the GLV drive 38. Then, the GLV 26 diffracts the slit-shaped RGB lights emitted from the light source 24 with varying the intensity of each light based on the supplied projection image signal.

The lights diffracted by the GLV 26 are reflected by the scanning mirror 28 toward the taking lens 14 such that the slit-shaped diffracted lights scan in a direction (i.e., the vertical direction, in this embodiment).

The diffracted lights made to scan by the scanning mirror 28 together, form an image, by means of the taking lens 14, on the screen disposed in front of the taking lens 14.

To form the image on the screen, the GLV 26 performs, by time division, the first, second and third diffracting operations, namely, the R light is diffracted by the GLV 38 in the first diffracting operation, while the G and B lights are diffracted in the second and third diffracting operations, respectively.

Therefore, the image with the R light is formed on the screen in the first diffracting operation, while the images with the G and B lights are formed on the screen in the second and third diffracting operations, respectively. Since the first through third diffracting operations are iterated by time division very quickly, the respective images of the R, G and B lights are synthesized as viewed, virtually producing a color image.

As described above, in the present embodiment the imaging apparatus 10 has the light source 24, the GLV 26 for diffracting the lights emitted from the light source 24, and the scanning mirror 28 for reflecting the diffracted lights toward the taking lens 14 with having the diffracted lights scan in a direction. This arrangement is advantageous in that the light source 24 has a reduced size compared to the white light source as conventionally used, and the cooling fan for cooling the light source 24 is omitted. Thus, reducing the size of an imaging apparatus having a projector function is facilitated.

Further, since a semiconductor laser consumes less electric power compared to the conventionally used white light source, the present imaging apparatus is advantageous in that the battery time is elongated where the imaging apparatus is operated on electricity stored in a battery.

<Second Embodiment>

There will be now described a second embodiment of the invention, by reference to FIG. 3.

FIG. 3 is a perspective view showing a structure of an imaging apparatus 10 according to the second embodiment. The same or similar elements as the corresponding elements in the first embodiment are denoted by the same reference numerals and detailed description thereof is omitted.

The difference between the first and second embodiments is that the light source of the second embodiment is disposed outside the housing of the apparatus.

As shown in FIG. 3, inside a housing 12 of the imaging apparatus 10 are disposed an image pickup device 22, a GLV 26, a scanning mirror 28, a mirror drive unit 30, a mirror mover 32, etc, similarly to the first embodiment.

Outside the housing 12 is provided a light source 24 such that one of opposite ends of an optical fiber 25 is attached to the light source 24 to introduce, to the inside of the housing 12, lights emitted from respective semiconductor lasers of the light source 24.

The other end of the optical fiber 25 is introduced into the housing 12 to be connected with the GLV 26, so that the emitted lights are radiated toward the GLV 26.

In the thus constructed imaging apparatus 10 where the light source 24 is provided outside the housing 12, the space inside the housing 12 to spare for the light source 24 is further reduced, making the imaging apparatus of the invention more advantageous in size reduction. In addition, similarly to the imaging apparatus of the first embodiment, the present imaging apparatus is advantageous over the conventional imaging apparatus in reducing the power consumption.

In each of the embodiments described above, the light source 24 comprises the three semiconductor lasers for RGB lights so that a color image is formed. However, in a case where a monochrome image is to be obtained, a single semiconductor laser constitutes the light source 24, to reduce the cost of the light source 24 and also to eliminate the necessity to control the operations of the light source 24 and GLV 26 by time division, so that the control of the light source 24 and GLV 26 is advantageously simplified.

Further, although in each embodiment described above a GLV 26 is commonly used for the three (RGB) laser lights, a plurality of GLVs may be provided for respective lights of different colors.

The direction of scanning of the diffracted lights is not limited to the vertical direction, but may be any directions including the lateral or horizontal direction.

The foregoing invention has been described in terms of preferred embodiments. However, those skilled, in the art will recognize that many variations of such embodiments exist. Such variations are intended to be within the scope of the present invention and the appended claims.

What is claimed is:

1. An imaging apparatus operable to generate image data based on an image of an object formed by means of a taking lens, and record the image data on a recording medium, the imaging apparatus comprising:

a light source constituted by a semiconductor laser which emits a light;

a Grating Light Valve which is supplied with a projection image signal and diffracts the light emitted from the light source with varying an intensity of the light based on the projection image signal which is used for projecting the image; and a scanning mirror which reflects the diffracted light toward the taking lens with having the diffracted light scan in a direction, so that the diffracted light forms the image of the object in front of the taking lens and by means of the taking lens.

2. The imaging apparatus of claim 1, further comprising a record/playback portion operable to record the image data onto the recording medium and to playback the image data from the recording medium, and wherein the projection image signal is generated by playing back the image data from the recording medium by the record/playback portion.

3. The imaging apparatus of claim 2, wherein the projection image signal is supplied from the record/playback portion to the Grating Light Valve.

4. The imaging apparatus of claim 1, wherein the projection image signal is supplied from an external device connected to the imaging apparatus to the Grating Light Valve.

5. The imaging apparatus of claim 1, further comprising a mirror mover which positions the scanning mirror in a light path of the taking lens when the image is to be formed in front of the taking lens with the diffracted light as scanning, and retracts the scanning mirror off the light path when the image data is to be recorded.

6. The imaging apparatus of claim 1, further comprising a housing and an image pickup device which takes the image of the object as formed by the taking lens to generate an image signal for producing the image data, the housing accommodating the image pickup device, the light source and the Grating Light Valve such that the image pickup device is disposed in a light path of the taking lens while the light source and the Grating Light Valve are respectively disposed above the light path.

7. The imaging apparatus of claim 1, further comprising a housing, and wherein the Grating Light Valve and the scanning mirror are disposed inside the housing, while the light source is disposed outside the housing and connected with the Grating Light Valve through an optical fiber.

8. The imaging apparatus of claim 1, wherein the light source is constructed to emit three lights, which are of red, green and blue colors, while the Grating Light Valve performs, by time division, a first diffracting operation to diffract the red light, a second diffracting operation to diffract the green light, and a third diffracting operation to diffract the blue light.

9. The imaging apparatus of claim 1, wherein the light source is constituted by three semiconductor lasers, which respectively emits a R (red), G (green) and B (blue) light.

10. The imaging apparatus of claim 1, further comprising:
a controller configured to control a Grating Light Valve drive and a light source drive to have the Grating Light Valve perform, by time division, a first diffracting operation, a second diffracting operation and a third diffracting operation.

11. The imaging apparatus of claim 10, wherein the first diffracting operation comprises diffracting the R light by the Grating Light Valve.

12. The imaging apparatus of claim 10, wherein the second diffracting operation comprises diffracting the G light by the Grating Light Valve.

13. The imaging apparatus of claim 10, wherein the third diffracting operation comprises diffracting the B light by the Grating Light Valve.

14. The imaging apparatus of claim 1, further comprising:
a controller configured to control a mirror mover to shift the scanning mirror between a retracted position and a non-retracted position.

15. The imaging apparatus of claim 1, further comprising:
a switch operable to select a mode of operation, said mode of operation being one of a projector mode and a video camera mode.

16. The imaging apparatus of claim 15, further comprising:
a liquid crystal display which displays the image while the image is being captured, or displays a previously taken image when the previously taken image is played back;
an image pickup device which generates a camera image signal indicative of the image;
a magnetic recording medium which stores the image;
an image processor which generates the image data by processing the image signal inputted from the image pickup device; and
a record/playback unit which records the image data onto the magnetic recording medium, which reads the image data from the recording medium for play back.

17. The imaging apparatus of claim 16, further comprising a controller, including:
means for switching between ON/OFF states in response to an operation of the ON/OFF button;
means for switching between a projector mode and a video mode;
means for controlling a scanning operations of the scanning mirror;
means for controlling a shifting of the scanning mirror;
means for controlling a Grating Light Valve drive;
means for controlling a light source drive; and
means for having a Grating Light Valve perform by time division, a first diffracting operation, a second diffracting operation and a third diffracting operation.

* * * * *